April 6, 1948.  H. W. LORD  2,439,256

TIMING CIRCUIT

Filed Feb. 21, 1944

Inventor:
Harold W. Lord,
by Harry E. Dunham
His Attorney.

Patented Apr. 6, 1948

2,439,256

UNITED STATES PATENT OFFICE 2,439,256

TIMING CIRCUIT

Harold W. Lord, Schenectady, N. Y., assignor to General Electric Company, a corporation of New York Application February 21, 1944, Serial No. 523,282

9 Claims. (Cl. 343—5)

1

The present invention relates to a circuit for producing periodic timing impulses. One use of such a circuit is in radio locating equipment where the timing impulses serve as range markers for echoes from remote objects.

An object of my invention is to provide an improved timing circuit in which the timing is compensated for variations in the supply voltage and in the frequency of the timing impulses.

Figure 1:
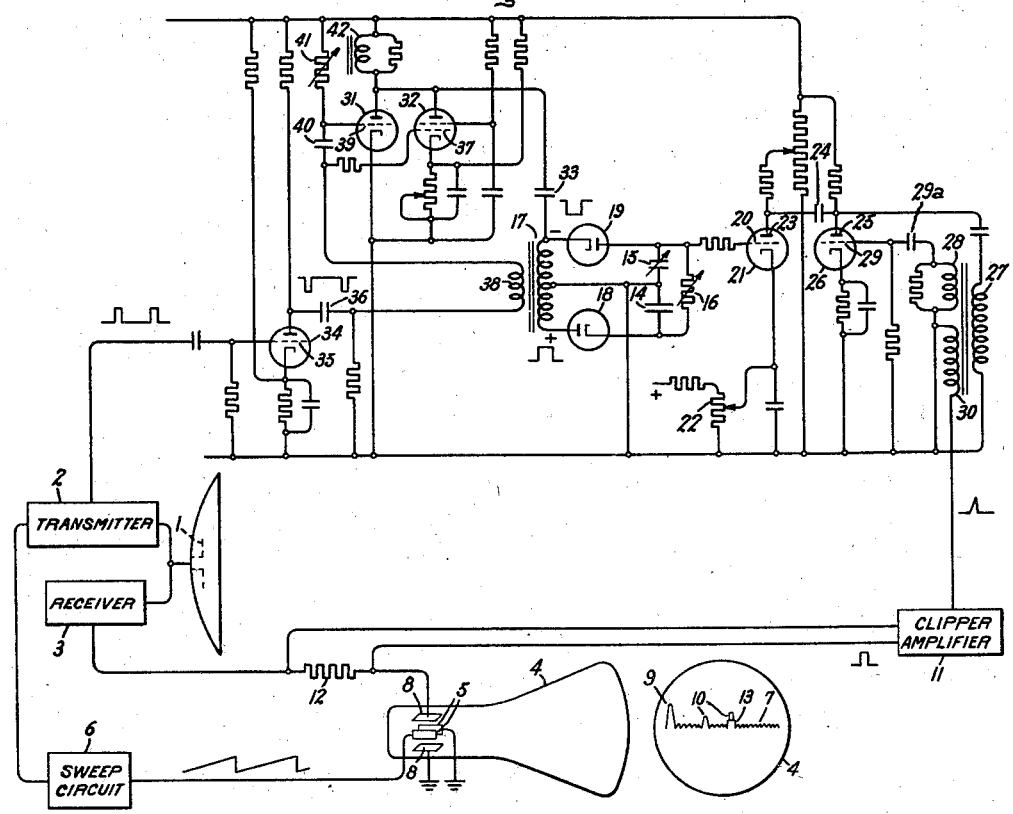
Figure 2:
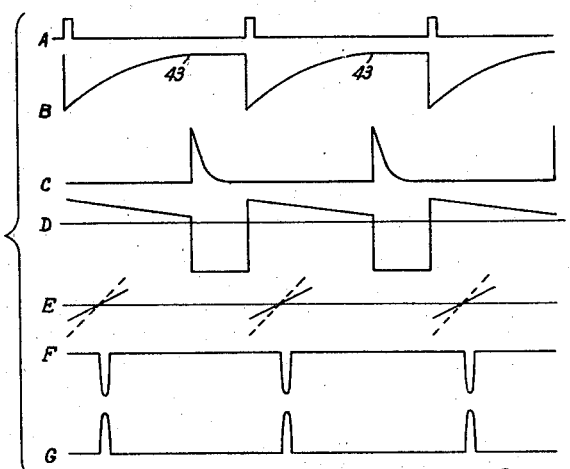

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a diagram of locating equipment embodying my invention, and Fig. 2 is an explanatory diagram.

Referring to the drawing, there is shown radio locating equipment having a directional antenna 1 to which are connected a transmitter 2 for transmitting pulses of radio waves at the desired repetition rate and a receiver 3 for echoes of the transmitted pulses which arrive at the receiver at intervals determined by the ranges of the reflecting objects. A visual display of the information is presented on the viewing screen of a cathode ray tube 4 having horizontal deflection plates 5 connected to a sweep circuit 6 keyed by the transmitter so as to produce a saw-tooth voltage increasing linearly from a minimum at each transmitted pulse to a maximum immediately prior to the succeeding transmitted pulse. On the viewing screen, the saw-tooth voltage causes superimposed horizontal traces 7. The receiver output is applied to vertical deflection plates 8 to modulate the sweep trace by vertical deflections 9 and 10 corresponding respectively to the transmitted pulses and to echoes from remote objects.

While the sweep trace provides a range scale on which the ranges of the remote objects are indicated by the distances between the deflections 9 and 10, there is need for a more precise indication of range which is furnished by the output of a clipper amplifier 11 connected across an impedance 12 in the circuit to the vertical deflection plates. The input of the clipper amplifier is a timing pulse of brief duration, e. g., 1 microsecond, obtained from a timing circuit presently to be described, and adjustable to occur at accurately adjustable intervals after each transmitted pulse. In the clipper amplifier, the timing pulse is converted to a square wave shape which results in the distinctive marker 13 on which is superimposed the deflection from the object at the range corresponding to the adjustment of the timing circuit.

2

The timing impulse is obtained from the discharge of condensers 14 and 15 in series through a discharge resistance 16. The condensers are oppositely charged, in a manner hereinafter described, with respect to a reference potential (ground) from an autotransformer 17 connected across the condensers through diodes 18 and 19. The condenser 14 is large compared to the condenser 15 so that the condenser 15 discharges exponentially into the condenser 14 at a rate determined by the constants of the discharge circuit. If the condensers 14 and 15 are linearly charged, i. e., if the ratio of the condenser voltages is constant, the voltage on the condenser 15 will reach the reference potential (ground) at a time independent of the magnitude of the charge. By using the point at which the charge on the condenser 15 changes sign to initiate the timing impulse, the timing is unaffected by variations in the voltage of the power supply.

The timing is adjustable by varying the condenser 15 and by varying the resistance 16. The voltage on the condenser 15 is applied to the grid 20 of a device 21 having a bias 22 adjusted so that it starts to conduct at the point at which charge on the condenser 15 changes sign with respect to the reference potential. The anode 23 of the device 21 is coupled through a condenser 24 to the anode 25 of a device 26 which is also normally biased to cut-off. When the device 21 starts to conduct, a negative potential is applied to the upper end of a transformer winding 27 which induces a positive voltage in a winding 28 connected to the grid 29 of the device 26, causing the device to conduct and apply a more negative voltage to the transformer winding 27. As a result of the regenerative feed-back from the winding 27 to the grid 29, the current through the device 26 continues to increase until saturation is reached. Subsequently, the device 26 blocks due to a negative charge on condenser 29a, and at this point a positive voltage is applied to the upper end of the transformer winding 27 which induces a negative voltage in the winding 28, driving the device 26 to cut-off. This results in a brief (1 microsecond) pulse of current in the winding 27 which induces a corresponding voltage in the transformer winding 30 connected to the clipper and amplifier 11.

The time at which the timing impulse appears in the winding 30 is determined by the adjustment of the condenser 15 and resistance 16 and by the time at which the discharge of the condensers 14 and 15 is started.

The discharge of the condensers 14 and 15 is started by interrupting the charging of the condensers through the diodes 18 and 19. During charging, a square wave voltage having the signs indicated on the drawing is applied from the autotransformer 17 through the diodes. During this time, which may be termed the recharging interval, devices 31 and 32 are conducting and a negative voltage is applied through a coupling condenser 33 to the upper end of the autotransformer winding which serves as the primary. The recharging interval is terminated to start the timing interval by a device 34 having a grid 35 coupled to the transmitter 2 so as to obtain positive pulses coincident with the transmitted pulses. The device 34, which is normally biased to cut-off, is biased on during each of the transmitted pulses and applies through the condenser 36 a negative pulse to the grid 37 of the device 32, driving the grid negative and reducing the current through this device. The reduction of current through the device 32 applies a positive voltage through the condenser 33 to the upper end of the autotransformer 17 which induces a negative voltage in a winding 38 connected to the grid 39 of the device 31, driving the device 31 to cut-off by negatively charging a condenser 40. The regenerative feedback through the winding 38 causes a sudden interruption in the current through the devices 31 and 32 which results in the application of a positive voltage to the diode 19 and a negative voltage to the diode 18. These voltages have no effect upon the condensers 14 and 15 which are isolated by the diodes. The discharge of the condensers 14 and 15 is accordingly keyed by the transmitter so as to start the timing interval coincident with each transmitted pulse. Since the timing interval is keyed by the transmitted pulses, the timing of the pulse appearing in the winding 30 is independent of variations in the pulse rate of the transmitter. The timing is always measured from the transmitted pulse which accordingly serves as an accurate measurement of the time of arrival of echoes.

The start of the recharging interval is determined by the time required for the negative voltage to leak off the condenser 40 through a resistance 41. The condenser 40 and resistance 41 comprise an RC timing circuit triggered through the device 34. The resistance 41 is adjusted so that the recharging interval starts some time after the arrival of echoes from objects at the maximum range of the equipment. As the negative voltage on the condenser 40 leaks off, the negative bias on the grid 39 decreases and finally becomes sufficient to cause the device 31 to conduct. The flow of current through the device 31 applies a negative voltage through the condenser 33 to the upper end of the autotransformer 17, which induces a positive voltage in the winding 38 connected to the grid 37 of the device 32, biasing the device 32 on. This results in a square wave voltage in the autotransformer 17, oppositely charging the condensers 14 and 15 with reference to ground. Because the condensers 14 and 15 are charged from windings on the same transformer core, the ratio of the voltages to which the condensers are charged is independent of the line voltage as required for accurate timing. So long as the condensers 14 and 15 are fully charged, the length of the recharging interval may be subject to wide variation without affecting the accuracy of the timing. In the present equipment the recharging interval may vary from a minimum of 70 microseconds to a maximum of 240 microseconds, which is considerably greater than the variation in the transmitted pulse rate.

The operation of the timing circuit is illustrated in Fig. 2, a series of diagrams on a common time scale, in which line A represents the transmitted pulses and line B represents the negative voltage on the condenser 40 charged through regenerative feedback from the winding 38 when the grid 37 of the device 32 is driven negative by the negative pulses from the device 34. The devices 31 and 32 are driven to cut-off coincident with the transmitted pulses. As indicated in line D, the interruption of the current in the devices 31 and 32 results in the application of a slight positive voltage at the upper end of the transformer 17 due to the energy stored in the transformer and in the inductance 42 in the common anode circuit of the devices 31 and 32. This positive voltage is isolated from the condensers 14 and 15 by the diodes 18 and 19 and accordingly has no effect on the discharge of the condensers which starts coincident with each transmitted pulse. The voltage on the smaller condenser 15, as indicated in line E, starts from a negative value determined by the voltage of the power supply, and increases exponentially at a rate determined by the adjustment of the condenser 15 and resistance 16. As indicated in line E, the point at which the voltage on condenser 15 changes sign with respect to ground is independent of the voltage on the condenser at the start of the timing interval. The point at which the voltage on the condenser 15 changes sign is used to bias the device 21 on, producing at its anode 23 a negative voltage indicated in line F. This voltage is applied to the upper end of the transformer winding 27 to bias the device 26 on and cause a brief pulse of current in the transformer winding 27 which induces a corresponding voltage in the winding 30 which serves as the timing impulse indicated in line G. The timing impulse is adjustable to occur during any part of the interval determined by the time required for the negative voltage on the condenser 40 to leak off through the resistance 41. When the negative voltage on the condenser 40 leaks off to the value indicated at 43 in line B, the device 31 is biased on, applying a negative voltage to the upper end of the autotransformer 17 which induces a positive voltage in the winding 38 connected to the grid 37 of the device 32. This results in the application of a square wave voltage to the condensers 14 and 15 indicated at line D in Fig. 2 and a condenser charging current indicated in line C. It will be noted that the condenser charging current is zero, and the condensers 14 and 15 are accordingly fully charged, a substantial time before the next transmitted pulse. During the charging of the condensers 14 and 15, the device 32 is biased on by a positive square wave voltage in winding 38 of the same shape as the condenser charging voltage. This voltage also causes the negative charging of condenser 40 by electrons attracted to the grid 39.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In combination, a pair of condensers, one of which is large compared to the other, means for simultaneously charging said condensers with voltages of opposite polarity with respect to a common reference potential, a discharge circuit for the condensers in series, and means to initiate a timing impulse in response to discharge of the smaller condenser to such an extent that the voltage thereon with respect to said common reference potential changes polarity.

2. In radio locating equipment, means for transmitting pulses at the desired repetition rate, a pair of condensers, one of which is large compared to the other, a discharge circuit connecting the condensers in series, a transformer connected across the condensers to charge the same with like polarities about said discharge circuit, means responsive to pulse transmission for interrupting the charging of said condensers, means responsive to the voltage on the smaller condenser and operative when said voltage changes sign to initiate a timing impulse, a timing circuit triggered by said transmitted pulse for reestablishing the charging of said condensers after a delay greater than the timing impulse but less than the succeeding transmitted pulse.

3. In combination, a pair of condensers, one of which is large compared to the other, a discharge circuit connecting the condensers in series, a charging circuit for oppositely charging the condensers with respect to a reference potential, means alternately rendering the charging and discharge circuits effective whereby the charge on the smaller condenser changes polarity with respect to said reference potential at a time when the discharge circuit is effective, and means responsive to said change in polarity to initiate a timing impulse.

4. In combination, a pair of condensers, one of which is large compared to the other, a discharge circuit connecting the condensers in series, a charging circuit including a transformer connected across the condensers to charge the same oppositely with respect to the potential at a point between said condensers, means for triggering the charging circuit off, means responsive to discharge of the smaller condenser to such an extent that the polarity of its charge reverses to initiate a timing impulse, and means for rendering the charging circuit effective following the timing impulse.

5. In combination, a pair of condensers, one of which is large compared to the other, a discharge circuit connecting the condensers in series, a charging circuit having means for applying a square wave voltage to the condensers oppositely charging the same with respect to a reference potential, means triggering said charging circuit off to initiate a timing interval, means for initiating a timing pulse in response to the reversal of polarity of said smaller condenser with respect to said reference potential as it discharges, and means for turning the charging circuit on at the end of the timing interval.

6. In combination, a pair of condensers of different capacitance, a discharge device having a cathode connected to one electrode of each of said condensers and a control electrode connected to the other electrode of the smaller of said condensers and through a discharge resistance to the other electrode of the larger of said condensers, means to charge said condensers with voltage of opposite polarity with respect to said cathode, and thereafter to discharge said condensers through said resistance whereby the potential of said control electrode reverses polarity with respect to the potential of said cathode at a predetermined time in the discharge of said condensers, and timing means controlled by the current in said discharge device.

7. Apparatus for producing a precise timing pulse occurring accurately at a predetermined time interval after a reference pulse comprising, in combination, a pair of condensers of unequal capacities connected in series across a discharge impedance, means for charging said condensers simultaneously from a common source to potentials of opposite polarity with respect to the connection between them, means for abruptly interrupting the application of said charging potentials to said condensers in response to said reference pulse, and means responsive to the reversal of sign of the potential across the smaller condenser with respect to said point, as the condensers discharge through said impedance, for initiating said timing pulse.

8. Apparatus for producing a precise timing pulse occurring accurately at a predetermined time interval after a reference pulse comprising, in combination, a pair of condensers of unequal capacities connected in series across a discharge impedance, means for simultaneously applying substantially square wave voltages derived from a common source upon both condensers in such senses as to charge them in opposite polarity with respect to the connection between them, means for abruptly interrupting the application of said voltages to said condensers in response to said reference pulse to initiate a timing interval, and means responsive to reversal in sign of potential across one of said condensers with respect to said connection, as said condensers discharge, for initiating said timing pulse, whereby said timing interval is substantially independent of voltage variations in said common source.

9. In a pulse locating system or the like wherein periodic energy pulses are transmitted, the combination of a timing network including two condensers of unequal capacities each having one terminal connected to a point of reference potential and the other terminal connected to one end of a common discharge impedance, means including charging connections for applying substantially square-wave potentials derived from a common supply source to said condensers, said connections including unilaterally conducting means poled to permit charging each of said condensers only in one polarity, said polarities being opposite with respect to said reference point, means for abruptly blocking said charging means in response to each transmitted pulse to initiate a timing interval, means responsive to reversal in polarity of the potential of the smaller of said condensers with respect to said reference point during discharge through said impedance for initiating a timing pulse at a predetermined time interval after said transmitted pulse, said time interval being independent of variations in said supply source over a substantial range, and means for unblocking said charging means following each timing pulse.

HAROLD W. LORD.

REFERENCES CITED

The following references are of record in the file of this patent:

UNITED STATES PATENTS

| Number | Name | Date |
| --- | --- | --- |
| 1,841,983 | Ruhlemann | Jan. 19, 1932 |
| 2,024,838 | Stansbury | Dec. 17, 1935 |
| 2,176,742 | Lapierre | Oct. 17, 1939 |